US009193915B2

(12) United States Patent
West et al.

(10) Patent No.: US 9,193,915 B2
(45) Date of Patent: Nov. 24, 2015

(54) HORIZONTAL HEAT RECOVERY COKE OVENS HAVING MONOLITH CROWNS

(71) Applicant: SunCoke Technology and Development LLC, Lisle, IL (US)

(72) Inventors: Gary Dean West, Lisle, IL (US); John Francis Quanci, Haddonfield, NJ (US)

(73) Assignee: SunCoke Technology and Development LLC., Lisle, IL (US)

( * ) Notice: Subject to any disclaimer, the term of this patent is extended or adjusted under 35 U.S.C. 154(b) by 194 days.

(21) Appl. No.: 13/829,588

(22) Filed: Mar. 14, 2013

(65) Prior Publication Data

US 2014/0262726 A1    Sep. 18, 2014

(51) Int. Cl.
*C10B 29/02* (2006.01)
*C10B 29/04* (2006.01)
*C10B 5/00* (2006.01)
*C10B 21/10* (2006.01)
*C10B 15/02* (2006.01)

(52) U.S. Cl.
CPC . *C10B 29/02* (2013.01); *C10B 5/00* (2013.01); *C10B 15/02* (2013.01); *C10B 21/10* (2013.01); *C10B 29/04* (2013.01)

(58) Field of Classification Search
CPC .......... C10B 5/00; C10B 15/02; C10B 21/00; C10B 21/10; C10B 29/00; C10B 29/04; C10B 29/06; F27D 1/00; F27D 1/02; F27D 1/025; F27D 1/04; F27D 1/10
USPC ........ 201/93, 98, 212, 244, 248, 250; 202/14, 202/18, 41
See application file for complete search history.

(56) References Cited

U.S. PATENT DOCUMENTS

| 469,868 A | 3/1892 | Thomas et al. |
| 1,140,798 A | 5/1915 | Carpenter |
| 1,424,777 A | 8/1922 | Schondeling |
| 1,430,027 A | 9/1922 | Plantinga |

(Continued)

FOREIGN PATENT DOCUMENTS

| CA | 2775992 A1 | 5/2011 |
| CA | 2822857 | 7/2012 |

(Continued)

OTHER PUBLICATIONS

JP 03-197588, Inoqu Keizo et al., Method and Equipment for Boring Degassing Hole in Coal Charge in Coke Oven, Japanese Patent (Abstract Only) Aug. 28, 1991.

(Continued)

*Primary Examiner* — Renee E Robinson
*Assistant Examiner* — Jonathan Miller
(74) *Attorney, Agent, or Firm* — Perkins Coie LLP

(57) ABSTRACT

The present technology is generally directed to horizontal heat recovery coke ovens having monolith crowns. In some embodiments, an HHR coke oven includes a monolith crown that spans the width of the oven between opposing oven sidewalls. The monolith expands upon heating and contracts upon cooling as a single structure. In further embodiments, the crown comprises a thermally volume-stable material. In various embodiments, the monolith and thermally-volume-stable features can be used in combination or alone. These designs can allow the oven to be turned down below traditionally feasible temperatures while maintaining the structural integrity of the crown.

17 Claims, 11 Drawing Sheets

(56) References Cited

U.S. PATENT DOCUMENTS

| | | | |
|---|---|---|---|
| 1,486,401 | A | 3/1924 | Van Ackeren |
| 1,572,391 | A | 2/1926 | Klaiber |
| 1,721,813 | A | 7/1929 | Rudolf et al. |
| 1,818,370 | A | 8/1931 | Wine |
| 1,848,818 | A | 3/1932 | Becker |
| 1,955,962 | A | 4/1934 | Jones |
| 2,394,173 | A | 2/1946 | Harris et al. |
| 2,424,012 | A | 7/1947 | Bangham et al. |
| 2,902,991 | A | 9/1959 | Whitman |
| 3,033,764 | A | 5/1962 | Hannes |
| 3,462,345 | A | 8/1969 | Kernan |
| 3,545,470 | A | 12/1970 | Paton |
| 3,616,408 | A | 10/1971 | Hickam |
| 3,630,852 | A | 12/1971 | Nashan et al. |
| 3,652,403 | A | 3/1972 | Knappstein et al. |
| 3,676,305 | A | 7/1972 | Cremer |
| 3,709,794 | A | 1/1973 | Kinzler et al. |
| 3,746,626 | A | 7/1973 | Morrison, Jr. |
| 3,748,235 | A | 7/1973 | Pries |
| 3,784,034 | A | 1/1974 | Thompson |
| 3,806,032 | A | 4/1974 | Pries |
| 3,836,161 | A | 9/1974 | Buhl |
| 3,839,156 | A | 10/1974 | Jakobi et al. |
| 3,844,900 | A | 10/1974 | Schulte |
| 3,857,758 | A | 12/1974 | Mole |
| 3,875,016 | A | 4/1975 | Schmidt-Balve et al. |
| 3,876,506 | A | 4/1975 | Dix et al. |
| 3,878,053 | A | 4/1975 | Hyde |
| 3,897,312 | A | 7/1975 | Armour et al. |
| 3,906,992 | A | 9/1975 | Leach |
| 3,912,091 | A | 10/1975 | Thompson |
| 3,917,458 | A | 11/1975 | Polak |
| 3,930,961 | A | 1/1976 | Sustarsic et al. |
| 3,957,591 | A | 5/1976 | Riecker |
| 3,959,084 | A | 5/1976 | Price |
| 3,963,582 | A | 6/1976 | Helm et al. |
| 3,969,191 | A | 7/1976 | Bollenbach |
| 3,984,289 | A | 10/1976 | Sustarsic et al. |
| 4,004,702 | A | 1/1977 | Szendroi |
| 4,004,983 | A | 1/1977 | Pries |
| 4,040,910 | A | 8/1977 | Knappstein et al. |
| 4,059,885 | A | 11/1977 | Oldengott |
| 4,067,462 | A | 1/1978 | Thompson |
| 4,083,753 | A | 4/1978 | Rogers et al. |
| 4,086,231 | A | 4/1978 | Ikio |
| 4,100,033 | A | 7/1978 | Holter |
| 4,111,757 | A | 9/1978 | Ciarimboli |
| 4,124,450 | A | 11/1978 | MacDonald |
| 4,141,796 | A | 2/1979 | Clark et al. |
| 4,145,195 | A | 3/1979 | Knappstein et al. |
| 4,147,230 | A | 4/1979 | Ormond et al. |
| 4,189,272 | A | 2/1980 | Gregor et al. |
| 4,194,951 | A | 3/1980 | Pries |
| 4,196,053 | A | 4/1980 | Grohmann |
| 4,211,608 | A | 7/1980 | Kwasnoski et al. |
| 4,213,489 | A | 7/1980 | Cain |
| 4,213,828 | A | 7/1980 | Calderon |
| 4,222,748 | A | 9/1980 | Argo et al. |
| 4,225,393 | A | 9/1980 | Gregor et al. |
| 4,235,830 | A | 11/1980 | Bennett et al. |
| 4,248,671 | A | 2/1981 | Belding |
| 4,249,997 | A | 2/1981 | Schmitz |
| 4,263,099 | A | 4/1981 | Porter |
| 4,285,772 | A | 8/1981 | Kress |
| 4,287,024 | A | 9/1981 | Thompson |
| 4,289,584 | A | 9/1981 | Chuss et al. |
| 4,289,585 | A | 9/1981 | Wagener et al. |
| 4,303,615 | A | 12/1981 | Jarmell et al. |
| 4,307,673 | A | 12/1981 | Caughey |
| 4,314,787 | A | 2/1982 | Kwasnik et al. |
| 4,330,372 | A | 5/1982 | Cairns et al. |
| 4,334,963 | A | 6/1982 | Stog |
| 4,336,843 | A | 6/1982 | Petty |
| 4,340,445 | A | 7/1982 | Kucher et al. |
| 4,342,195 | A | 8/1982 | Lo |
| 4,344,820 | A | 8/1982 | Thompson |
| 4,366,029 | A | 12/1982 | Bixby et al. |
| 4,373,244 | A | 2/1983 | Mertens et al. |
| 4,375,388 | A | 3/1983 | Hara et al. |
| 4,391,674 | A | 7/1983 | Velmin et al. |
| 4,392,824 | A | 7/1983 | Struck et al. |
| 4,395,269 | A | 7/1983 | Schuler |
| 4,396,394 | A | 8/1983 | Li et al. |
| 4,396,461 | A | 8/1983 | Neubaum et al. |
| 4,431,484 | A | 2/1984 | Weber et al. |
| 4,439,277 | A | 3/1984 | Dix |
| 4,445,977 | A | 5/1984 | Husher |
| 4,446,018 | A | 5/1984 | Cerwick |
| 4,448,541 | A | 5/1984 | Wirtschafter |
| 4,452,749 | A * | 6/1984 | Kolvek et al. ............. 264/30 |
| 4,459,103 | A | 7/1984 | Gieskieng |
| 4,469,446 | A | 9/1984 | Goodboy |
| 4,498,786 | A | 2/1985 | Ruscheweyh |
| 4,508,539 | A | 4/1985 | Nakai |
| 4,527,488 | A | 7/1985 | Lindgren |
| 4,568,426 | A | 2/1986 | Orlando et al. |
| 4,570,670 | A | 2/1986 | Johnson |
| 4,614,567 | A | 9/1986 | Stahlherm et al. |
| 4,645,513 | A | 2/1987 | Kubota et al. |
| 4,655,193 | A | 4/1987 | Blacket |
| 4,655,804 | A | 4/1987 | Kercheval et al. |
| 4,680,167 | A | 7/1987 | Orlando et al. |
| 4,704,195 | A | 11/1987 | Janicka et al. |
| 4,720,262 | A | 1/1988 | Durr et al. |
| 4,726,465 | A | 2/1988 | Kwasnik et al. |
| 4,929,179 | A | 5/1990 | Breidenbach et al. |
| 4,941,824 | A * | 7/1990 | Holter et al. ............. 432/233 |
| 5,052,922 | A | 10/1991 | Stokman et al. |
| 5,062,925 | A | 11/1991 | Durselen et al. |
| 5,078,822 | A | 1/1992 | Hodges et al. |
| 5,114,542 | A | 5/1992 | Childress et al. |
| 5,227,106 | A * | 7/1993 | Kolvek ............. 264/654 |
| 5,228,955 | A | 7/1993 | Westbrook, III |
| 5,318,671 | A | 6/1994 | Pruitt |
| 5,670,025 | A | 9/1997 | Baird |
| 5,928,476 | A | 7/1999 | Daniels |
| 5,968,320 | A | 10/1999 | Sprague |
| 6,017,214 | A | 1/2000 | Sturgulewski |
| 6,059,932 | A | 5/2000 | Sturgulewski |
| 6,139,692 | A | 10/2000 | Tamura et al. |
| 6,152,668 | A | 11/2000 | Knoch |
| 6,187,148 | B1 | 2/2001 | Sturgulewski |
| 6,189,819 | B1 | 2/2001 | Racine |
| 6,290,494 | B1 | 9/2001 | Barkdoll |
| 6,596,128 | B2 | 7/2003 | Westbrook |
| 6,626,984 | B1 | 9/2003 | Taylor |
| 6,699,035 | B2 | 3/2004 | Brooker |
| 6,758,875 | B2 | 7/2004 | Reid et al. |
| 6,907,895 | B2 | 6/2005 | Johnson et al. |
| 6,946,011 | B2 | 9/2005 | Snyder |
| 7,056,390 | B2 | 6/2006 | Fratello et al. |
| 7,077,892 | B2 | 7/2006 | Lee |
| 7,314,060 | B2 | 1/2008 | Chen et al. |
| 7,331,298 | B2 | 2/2008 | Taylor et al. |
| 7,497,930 | B2 | 3/2009 | Barkdoll et al. |
| 7,611,609 | B1 | 11/2009 | Valia et al. |
| 7,644,711 | B2 | 1/2010 | Creel |
| 7,727,307 | B2 | 6/2010 | Winkler |
| 7,803,627 | B2 | 9/2010 | Hodges |
| 7,827,689 | B2 * | 11/2010 | Crane et al. ............. 29/890.031 |
| 7,998,316 | B2 | 8/2011 | Barkdoll et al. |
| 8,071,060 | B2 | 12/2011 | Ukai et al. |
| 8,079,751 | B2 | 12/2011 | Kapila et al. |
| 8,152,970 | B2 | 4/2012 | Barkdoll et al. |
| 8,236,142 | B2 | 8/2012 | Westbrook et al. |
| 8,266,853 | B2 * | 9/2012 | Bloom et al. ............. 52/218 |
| 8,398,935 | B2 | 3/2013 | Howell, Jr. et al. |
| 2002/0134659 | A1 | 9/2002 | Westbrook |
| 2006/0102420 | A1 | 5/2006 | Huber et al. |
| 2008/0169578 | A1* | 7/2008 | Crane et al. ............. 264/30 |
| 2008/0179165 | A1 | 7/2008 | Chen et al. |
| 2008/0271985 | A1 | 11/2008 | Yamasaki |
| 2009/0217576 | A1 | 9/2009 | Kim et al. |
| 2009/0283395 | A1* | 11/2009 | Hippe ............. 201/41 |

(56) References Cited

U.S. PATENT DOCUMENTS

| | | |
|---|---|---|
| 2010/0095521 A1 | 4/2010 | Bertini et al. |
| 2010/0115912 A1 | 5/2010 | Worley et al. |
| 2010/0287871 A1* | 11/2010 | Bloom et al. .......... 52/505 |
| 2011/0048917 A1 | 3/2011 | Kim et al. |
| 2011/0223088 A1 | 9/2011 | Chang et al. |
| 2011/0253521 A1 | 10/2011 | Kim |
| 2012/0024688 A1 | 2/2012 | Barkdoll |
| 2012/0030998 A1 | 2/2012 | Barkdoll et al. |
| 2012/0152720 A1 | 6/2012 | Reichelt et al. |
| 2012/0228115 A1 | 9/2012 | Westbrook |
| 2013/0216717 A1 | 8/2013 | Rago et al. |
| 2013/0306462 A1 | 11/2013 | Kim et al. |
| 2014/0033917 A1 | 2/2014 | Rodgers et al. |
| 2014/0048402 A1 | 2/2014 | Quanci et al. |
| 2014/0048404 A1 | 2/2014 | Quanci et al. |
| 2014/0048405 A1 | 2/2014 | Quanci et al. |
| 2014/0061018 A1 | 3/2014 | Sarpen et al. |
| 2014/0083836 A1 | 3/2014 | Quanci et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0183024 A1 | 7/2014 | Chun et al. |
| 2014/0183026 A1 | 7/2014 | Quanci et al. |
| 2014/0262139 A1 | 9/2014 | Choi et al. |
| 2015/0122629 A1 | 5/2015 | Freimuth et al. |
| 2015/0247092 A1 | 9/2015 | Quanci et al. |

FOREIGN PATENT DOCUMENTS

| | | |
|---|---|---|
| CN | 2064363 | 10/1990 |
| CN | 2064363 U | 10/1990 |
| CN | 1092457 A | 9/1994 |
| CN | 1255528 A | 6/2000 |
| CN | 1358822 A | 7/2002 |
| CN | 2509188 Y | 9/2002 |
| CN | 2528771 Y | 1/2003 |
| CN | 1468364 A | 1/2004 |
| CN | 2668641 Y | 1/2005 |
| CN | 202226816 U | 5/2012 |
| DE | 212176 C | 7/1909 |
| DE | 3315738 A1 | 11/1983 |
| DE | 3329367 C1 | 11/1984 |
| DE | 19545736 A1 | 6/1997 |
| DE | 19803455 C1 | 8/1999 |
| DE | 10154785 A1 | 5/2003 |
| DE | 102009031436 | 1/2011 |
| DE | 102011052785 B3 | 12/2012 |
| FR | 2339664 A1 | 8/1977 |
| GB | 441784 A | 1/1936 |
| GB | 606340 A | 8/1948 |
| GB | 611524 A | 11/1948 |
| GB | 725865 A | 3/1955 |
| GB | 871094 A | 6/1961 |
| JP | S50148405 | 11/1975 |
| JP | 54054101 A | 4/1979 |
| JP | 57051786 A | 3/1982 |
| JP | 57051787 A | 3/1982 |
| JP | 57083585 A | 5/1982 |
| JP | 57090092 A | 6/1982 |
| JP | 58091788 A | 5/1983 |
| JP | 59051978 A | 3/1984 |
| JP | 59053589 A | 3/1984 |
| JP | 59071388 A | 4/1984 |
| JP | 59108083 A | 6/1984 |
| JP | 59145281 A | 8/1984 |
| JP | 60004588 A | 1/1985 |
| JP | 61106690 A | 5/1986 |
| JP | 62011794 A | 1/1987 |
| JP | 62285980 | 12/1987 |
| JP | 01103694 A | 4/1989 |
| JP | 01249886 A | 10/1989 |
| JP | H0319127 | 1/1991 |
| JP | 07188668 | 7/1995 |
| JP | 07216357 | 8/1995 |
| JP | 08127778 A | 5/1996 |
| JP | 2001200258 A | 7/2001 |
| JP | 03197588 B2 | 8/2001 |
| JP | 2002106941 A | 4/2002 |
| JP | 200341258 A | 2/2003 |
| JP | 2003071313 A | 3/2003 |
| JP | 04159392 B2 | 10/2008 |
| JP | 2009144121 A | 7/2009 |
| JP | 2012102302 A | 5/2012 |
| KR | 960008754 Y1 | 10/1996 |
| KR | 1019990054426 | 12/1999 |
| KR | 10-0797852 | 1/2008 |
| KR | 10-2011-0010452 A | 2/2011 |
| KR | 10-0296700 B1 | 10/2011 |
| KR | 101318388 B1 | 10/2013 |
| WO | WO-9012074 A1 | 10/1990 |
| WO | WO-9945083 A1 | 9/1999 |
| WO | WO-2007103649 A2 | 9/2007 |
| WO | WO-2008034424 A1 | 3/2008 |
| WO | WO-2010107513 A1 | 9/2010 |
| WO | WO-2011000447 A1 | 1/2011 |
| WO | WO-2012029979 A1 | 3/2012 |
| WO | WO-2013023872 A1 | 2/2013 |

OTHER PUBLICATIONS

JP 04-159392, Inoue Keizo et al., Method and Equipment for Opening Hole for Degassing of Coal Charge in Coke Oven, Japanese Patent (Abstract Only) Jun. 2, 1992.

International Search Report and Written Opinion issued for PCT/US2014/028837 and mailed on Aug. 21, 2014, 11 pages.

Crelling, et al., "Effects of Weathered Coal on Coking Properties and Coke Quality", Fuel, 1979, vol. 58, Issue 7, pp. 542-546.

Database WPI, Week 199115, Thomson Scientific, Lond, GB; AN 1991-107552.

Diez, et al., "Coal for Metallurgical Coke Production: Predictions of Coke Quality and Future Requirements for Cokemaking", International Journal of Coal Geology, 2002, vol. 50, Issue 1-4, pp. 389-412.

International Search Report and Written Opinion of International Application No. PCT/US2014/028837; Date of Mailing: Aug. 21, 2014; 11 pages.

ASTM D5341-99(2010)e1, Standard Test Method for Measuring Coke Reactivity Index (CRI) and Coke Strength After Reaction (CSR), ASTM International, West Conshohocken, PA, 2010.

Clean coke process: process development studies by USS Engineers and Consultants, Inc., Wisconsin Tech Search, request date Oct. 5, 2011, 17 pages.

Rose, Harold J., "The Selection of Coals for the Manufacture of Coke," American Institute of Mining and Metallurgical Engineers, Feb. 1926, 8 pages.

U.S. Appl. No. 14/839,384, filed Aug. 28, 2015, Quanci et al.
U.S. Appl. No. 14/839,493, filed Aug. 28, 2015, Quanci et al.
U.S. Appl. No. 14/839,551, filed Aug. 28, 2015, Quanci et al.
U.S. Appl. No. 14/839,588, filed Aug. 28, 2015, Quanci et al.
U.S. Appl. No. 14/865,581, filed Sep. 25, 2015, Sarpen et al.

\* cited by examiner

US 9,193,915 B2

HORIZONTAL HEAT RECOVERY COKE OVENS HAVING MONOLITH CROWNS

TECHNICAL FIELD

The present technology is generally directed to horizontal heat recovery coke ovens having monolith crowns.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for 24 to 48 hours under closely-controlled atmospheric conditions. Coking ovens have been used for many years to convert coal into metallurgical coke. During the coking process, finely crushed coal is heated under controlled temperature conditions to devolatilize the coal and form a fused mass of coke having a predetermined porosity and strength. Because the production of coke is a batch process, multiple coke ovens are operated simultaneously.

The melting and fusion process undergone by the coal particles during the heating process is an important part of coking. The degree of melting and degree of assimilation of the coal particles into the molten mass determine the characteristics of the coke produced. In order to produce the strongest coke from a particular coal or coal blend, there is an optimum ratio of reactive to inert entities in the coal. The porosity and strength of the coke are important for the ore refining process and are determined by the coal source and/or method of coking.

Coal particles or a blend of coal particles are charged into hot ovens, and the coal is heated in the ovens in order to remove volatile matter ("VM") from the resulting coke. The coking process is highly dependent on the oven design, the type of coal, and the conversion temperature used. Typically, ovens are adjusted during the coking process so that each charge of coal is coked out in approximately the same amount of time. Once the coal is "coked out" or fully coked, the coke is removed from the oven and quenched with water to cool it below its ignition temperature. Alternatively, the coke is dry quenched with an inert gas. The quenching operation must also be carefully controlled so that the coke does not absorb too much moisture. Once it is quenched, the coke is screened and loaded into rail cars or trucks for shipment.

Because coal is fed into hot ovens, much of the coal feeding process is automated. In slot-type or vertical ovens, the coal is typically charged through slots or openings in the top of the ovens. Such ovens tend to be tall and narrow. Horizontal non-recovery or heat recovery type coking ovens are also used to produce coke. In the non-recovery or heat recovery type coking ovens, conveyors are used to convey the coal particles horizontally into the ovens to provide an elongate bed of coal.

As the source of coal suitable for forming metallurgical coal ("coking coal") has decreased, attempts have been made to blend weak or lower quality coals ("non-coking coal") with coking coals to provide a suitable coal charge for the ovens. One way to combine non-coking and coking coals is to use compacted or stamp-charged coal. The coal may be compacted before or after it is in the oven. In some embodiments, a mixture of non-coking and coking coals is compacted to greater than 50 pounds per cubic foot in order to use non-coking coal in the coke making process. As the percentage of non-coking coal in the coal mixture is increased, higher levels of coal compaction are required (e.g., up to about 65 to 75 pounds per cubic foot). Commercially, coal is typically compacted to about 1.15 to 1.2 specific gravity (sg) or about 70-75 pounds per cubic foot.

Horizontal Heat Recovery ("HHR") ovens have a unique environmental advantage over chemical byproduct ovens based upon the relative operating atmospheric pressure conditions inside HHR ovens. HHR ovens operate under negative pressure, whereas chemical byproduct ovens operate at a slightly positive atmospheric pressure. Both oven types are typically constructed of refractory bricks and other materials in which creating a substantially airtight environment can be a challenge because small cracks can form in these structures during day-to-day operation. Chemical byproduct ovens are kept at a positive pressure to avoid oxidizing recoverable products and overheating the ovens. Conversely, HHR ovens are kept at a negative pressure, drawing in air from outside the oven to oxidize the coal's VM and to release the heat of combustion within the oven. It is important to minimize the loss of volatile gases to the environment, so the combination of positive atmospheric conditions and small openings or cracks in chemical byproduct ovens allow raw coke oven gas ("COG") and hazardous pollutants to leak into the atmosphere. Conversely, the negative atmospheric conditions and small openings or cracks in the HHR ovens or locations elsewhere in the coke plant simply allow additional air to be drawn into the oven or other locations in the coke plant so that the negative atmospheric conditions resist the loss of COG to the atmosphere.

HHR ovens have traditionally been unable to turn down their operation (e.g., their coke production) significantly below their designed capacity without potentially damaging the ovens. This restraint is linked to temperature limitations in the ovens. More specifically, traditional HHR ovens are at least partially made of silica brick. When a silica oven is built, burnable spacers are placed between the bricks in the oven crown to allow for brick expansion. Once the oven is heated, the spacers burn away and the bricks expand into adjacency. Once HHR silica brick ovens are heated, they are never allowed to drop below the silica brick thermally-volume-stable temperature, the temperature above which silica is generally volume-stable (i.e., does not expand or contract). If the bricks drop below this temperature, the bricks start to contract. Since the spacers have burned out, a traditional crown can contract up to several inches upon cooling. This is potentially enough movement for the crown bricks to start to shift and potentially collapse. Therefore, enough heat must be maintained in the ovens to keep the bricks above the thermally-volume-stable temperature. This is the reason why it has been stated that a HHR oven can never be turned off. Because the ovens cannot be significantly turned down, during periods of low steel and coke demand, coke production must be sustained. Further, it can be difficult to perform maintenance on heated HHR ovens. Other portions of the coke oven system can suffer from similar thermal and/or structural limitations. For example, the crown of a sole flue running under the oven floor can collapse or otherwise suffer from heaving of the oven floor, ground settling, thermal or structural cycling, or other fatigue. These stresses can cause bricks in the sole flue to shift and drop out.

DETAILED DESCRIPTION

The present technology is generally directed to horizontal heat recovery coke ovens having monolith crowns. In some embodiments, a HHR coke oven includes a monolith crown that spans the width of the oven between opposing oven sidewalls. The monolith expands upon heating and contracts upon cooling as a single structure. In further embodiments, the crown comprises a thermally-volume-stable material. In various embodiments, the monolith and thermally-volume-stable features can be used in combination or alone. These designs can allow the oven to be turned down below traditionally-feasible temperatures while maintaining the structural integrity of the crown.

Specific details of several embodiments of the technology are described below with reference to FIGS. 1A-5. Other details describing well-known structures and systems often associated with coke ovens have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1A-5.

Figure 1A:
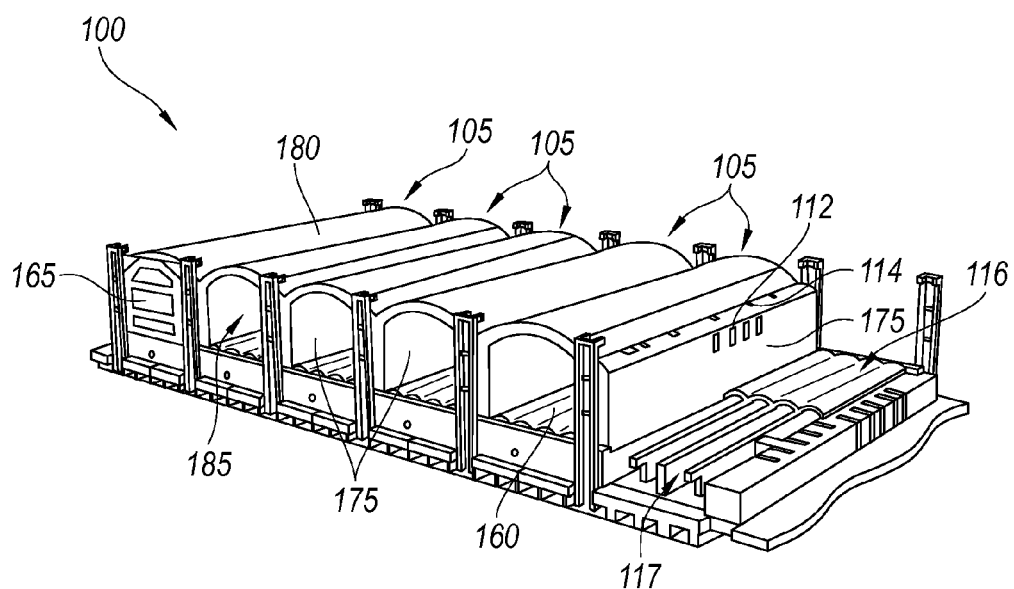
FIG. 1A is an isometric, partial cut-away view of a portion of a horizontal heat recovery coke plant configured in accordance with embodiments of the present technology.

FIG. 1A is an isometric, partial cut-away view of a portion of a horizontal heat recovery ("HHR") coke plant 100 configured in accordance with embodiments of the technology. The plant 100 includes a plurality of coke ovens 105. Each oven 105 can include an open cavity defined by a floor 160, a front door 165 forming substantially the entirety of one side of the oven, a rear door (not shown) opposite the front door 165 forming substantially the entirety of the side of the oven opposite the front door, two sidewalls 175 extending upwardly from the oven floor 160 intermediate the front door 165 and rear door, and a crown 180 that forms the top surface of the open cavity of an oven chamber 185. A first end of the crown 180 can rest on a first sidewall 175 while a second end of the crown 180 can rest on an opposing sidewall 175 as shown. Adjacent ovens 105 can share a common sidewall 175.

Figure 1B:
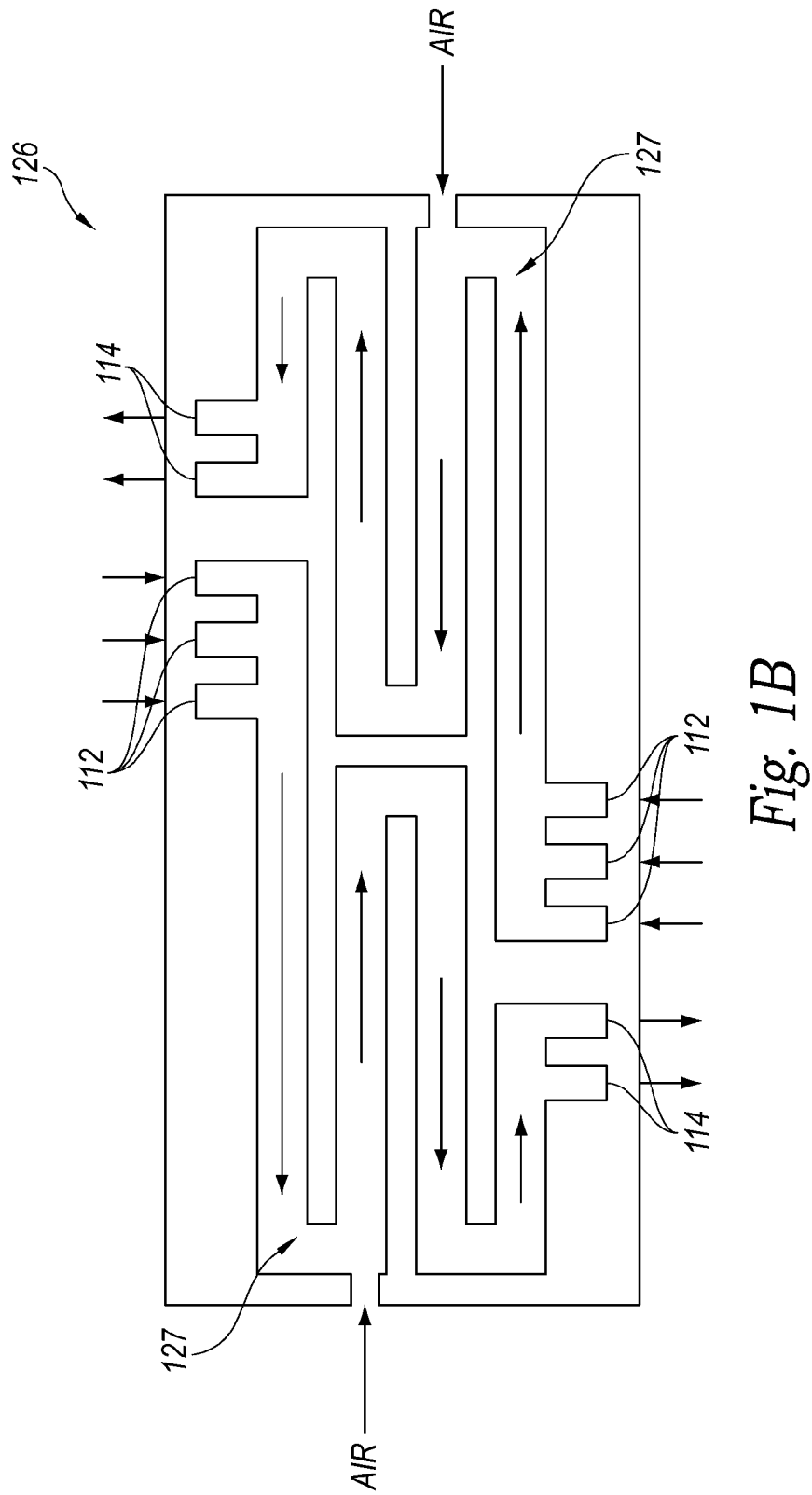
FIG. 1B is a top view of a sole flue portion of a horizontal heat recovery coke oven configured in accordance with embodiments of the technology.

In operation, volatile gases emitted from the coal positioned inside the oven chamber 185 collect in the crown 180 and are drawn downstream in the overall system into downcomer channels 112 formed in one or both sidewalls 175. The downcomer channels 112 fluidly connect the oven chamber 185 with a sole flue 116 positioned beneath the oven floor 160. The sole flue 116 includes a plurality of side-by-side runs 117 that form a circuitous path beneath the oven floor 160. While the runs 117 in FIG. 1A are shown to be substantially parallel to a longitudinal axis of the oven 105 (i.e., parallel to the sidewalls 175), in further embodiments the sole flue 116 can be configured such that at least some segments of the runs 117 are generally perpendicular to the longitudinal axis of the oven 105 (i.e., perpendicular to the sidewalls 175). This arrangement is illustrated in FIG. 1B and is discussed in further detail below. Volatile gases emitted from the coal can be combusted in the sole flue 116, thereby generating heat to support the reduction of coal into coke. The downcomer channels 112 are fluidly connected to chimneys or uptake channels 114 formed in one or both sidewalls 175.

Coke is produced in the ovens 105 by first loading coal into the oven chamber 185, heating the coal in an oxygen-depleted environment, driving off the volatile fraction of coal, and then oxidizing the VM within the oven 105 to capture and utilize the heat given off. The coal volatiles are oxidized within the ovens 105 over an extended coking cycle and release heat to regeneratively drive the carbonization of the coal to coke. The coking cycle begins when the front door 165 is opened and coal is charged onto the oven floor 160. The coal on the oven floor 160 is known as the coal bed. Heat from the oven (due to the previous coking cycle) starts the carbonization cycle. Roughly half of the total heat transfer to the coal bed is radiated down onto the top surface of the coal bed from the luminous flame of the coal bed and the radiant oven crown 180. The remaining half of the heat is transferred to the coal bed by conduction from the oven floor 160, which is convectively heated from the volatilization of gases in the sole flue 116. In this way, a carbonization process "wave" of plastic flow of the coal particles and formation of high strength cohesive coke proceeds from both the top and bottom boundaries of the coal bed.

Typically, each oven 105 is operated at negative pressure so air is drawn into the oven during the reduction process due to the pressure differential between the oven 105 and the atmosphere. Primary air for combustion is added to the oven chamber 185 to partially oxidize the coal volatiles, but the amount of this primary air is controlled so that only a portion of the volatiles released from the coal are combusted in the oven chamber 185, thereby releasing only a fraction of their enthalpy of combustion within the oven chamber 185. The primary air is introduced into the oven chamber 185 above the coal bed. The partially combusted gases pass from the oven chamber 185 through the downcomer channels 112 into the sole flue 116 where secondary air is added to the partially combusted gases. As the secondary air is introduced, the partially combusted gases are more fully combusted in the sole flue 116, thereby extracting the remaining enthalpy of combustion, which is conveyed through the oven floor 160 to add heat to the oven chamber 185. The fully or nearly fully combusted exhaust gases exit the sole flue 116 through the uptake channels 114. At the end of the coking cycle, the coal has coked out and has carbonized to produce coke. The coke can be removed from the oven 105 through the rear door utilizing a mechanical extraction system. Finally, the coke is quenched (e.g., wet or dry quenched) and sized before delivery to a user.

Figure 3:
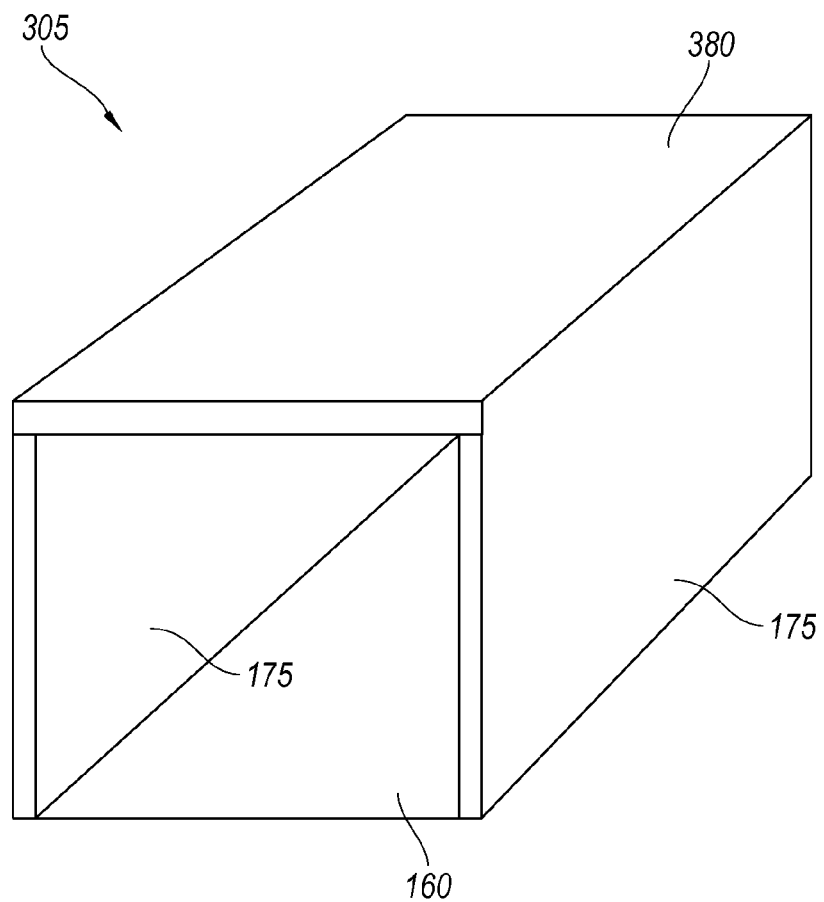
FIG. 3 is an isometric view of a coke oven having a monolith crown configured in accordance with further embodiments of the technology.
Figure 4A:
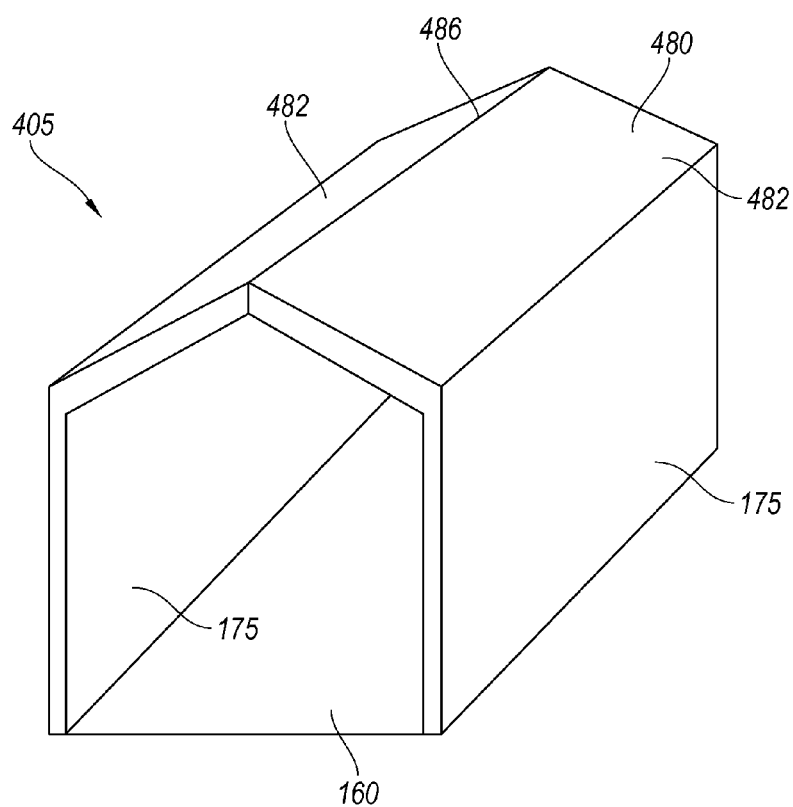
FIG. 4A is an isometric view of a coke oven having a monolith crown configured in accordance with still further embodiments of the technology.

As will be discussed in further detail below with reference to FIGS. 2A-5, in several embodiments the crown 180 comprises a monolith structure configured to span all or a portion of the distance between the sidewalls 175. For example, the crown 180 can comprise a single segment that spans between the sidewalls 175 or can comprise two, three, four, or more segments that meet between the sidewalls 175 and in combination span between the sidewalls 175. The monolith structure enables the crown 180 to expand upon oven heating and retract upon cooling without allowing individual bricks to contract and fall into the oven chamber 185, causing the crown 180 to collapse. The monolith crown 180 can accordingly allow the oven 105 to be shut down or turned down below traditionally feasible temperatures for a given crown material. As discussed above, some materials, like silica, become generally thermally-volume-stable above certain temperatures (i.e., around 1,200° F. for silica). Using a crown 180, a silica brick oven can be turned down below 1,200° F. Other materials, such as alumina, have no thermally-volume-stable upper limit (i.e., remain volume-unstable), and the crown 180 allows for the use of these materials without collapse from cooling contraction. In other embodiments, other materials or combinations of materials can be used for the crown, with different materials having different associated thermally-volume-stable temperatures. Further, the monolith crown 180 can be quickly installed, as the whole arch can be lifted and placed as a single structure. Further, by using monolith segments instead of numerous individual bricks, the crown 180 can be built in shapes different from the traditional arch—such as a flat or straight-edged shape. Some of these designs are shown in FIGS. 3 and 4A. In various embodiments, the monolith crown 180 can be pre-formed or formed on site. The crown 180 can have various widths (i.e., from sidewall-to-sidewall) in different embodiments. In some embodiments, the crown 180 width is about 3 feet or greater, while in particular embodiments the width is 12-15 feet.

In some embodiments, the crown 180 is at least partially made of a thermally-volume-stable material such that upon heating or cooling the oven chamber 185, the crown 180 does not adjust in position. As with a monolith design, a crown 180 made of a thermally-volume-stable material allows the oven 105 to be shut down or turned down without individual bricks in the crown 180 contracting and collapsing into the oven chamber 185. While the term "thermally-volume-stable material" is used herein, this term can refer to materials that are zero-expansion, zero-contraction, near-zero-expansion, and/or near-zero-contraction, or a combination of these characteristics, upon heating and/or cooling. In some embodiments, the thermally-volume-stable materials can be pre-cast or pre-fabricated into designed shapes, including as individual bricks or monolith segments. Further, in some embodiments, the thermally-volume-stable materials can be repeatedly heated and cooled without affecting the expandability characteristics of the material, while in other embodiments the material can be heated and/or cooled only once before undergoing a phase or material change that affects subsequent expandability characteristics. In a particular embodiment the thermally-volume-stable material is a fused silica material, zirconia, refractory material, or a ceramic material. In further embodiments, other portions of the oven 105 additionally or alternately can be formed of thermally-volume-stable materials. For example, in some embodiments, the lintel for the door 165 comprises such a material. When using thermally-volume-stable materials, traditional-sized bricks or a monolith structure can be used as the crown 180.

In some embodiments, the monolith or thermally-volume-stable designs can be used at other points in the plant 100, such as over the sole flue 116, as part of the oven floor 160 or sidewalls 175, or other portions of the oven 105. In any of these locations, the monolith or thermally-volume-stable embodiments can be used as an individual structure or as a combination of sections. For example, a crown 180 or oven floor 160 can comprise multiple monolith segments and/or multiple segments made of thermally-volume-stable material. In another embodiment, as shown in FIG. 1A, a monolith over the sole flue 116 comprises a plurality of side-by-side arches, each arch covering a run 117 of the sole flue 116. Since the arches comprise a single structure, they can expand and contract as a single unit. In further embodiments (as will be discussed in further detail below), the crown of the sole flue can comprise other shapes, such as a flat top. In still further embodiments, the sole flue crown comprises individual segments (e.g., individual arches or flat portions) that each span only one run 117 of the sole flue 116.

FIG. 1B is a top view of a sole flue 126 of a horizontal heat recovery coke oven configured in accordance with embodiments of the technology. The sole flue 126 has several features generally similar to the sole flue 116 described above with reference to FIG. 1A. For example, the sole flue includes a serpentine or labyrinth pattern of runs 127 configured for communication with a coke oven (e.g., the coke oven 105 of FIG. 1A) via the downcomer channels 112 and uptake channels 114. Volatile gases emitted from the coal positioned inside a coke oven chamber are drawn downstream into the downcomer channels 112 and into the sole flue 126. Volatile gases emitted from the coal can be combusted in the sole flue 126, thereby generating heat to support the reduction of coal into coke. The downcomer channels 112 are fluidly connected to chimneys or uptake channels 114, which draw fully or nearly fully combusted exhaust gases from the sole flue 126.

In FIG. 1B, at least some segments of the runs 127 are generally perpendicular to the longitudinal axis of the oven 105 (i.e., perpendicular to the sidewalls 175 shown in FIG. 1A). As with the sole flue 116 shown in FIG. 1A, the sole flue 126 of FIG. 1B can include a crown portion that spans individual runs 127 or a plurality of runs 127. The sole flue crown can comprise a flat segment, a single arch, a plurality of adjacent arches, a combination of these shapes, or other shapes. Further, the sole flue crown can span and/or follow the turns or curves of the sole flue serpentine pathway of runs 127.

Figure 1C:
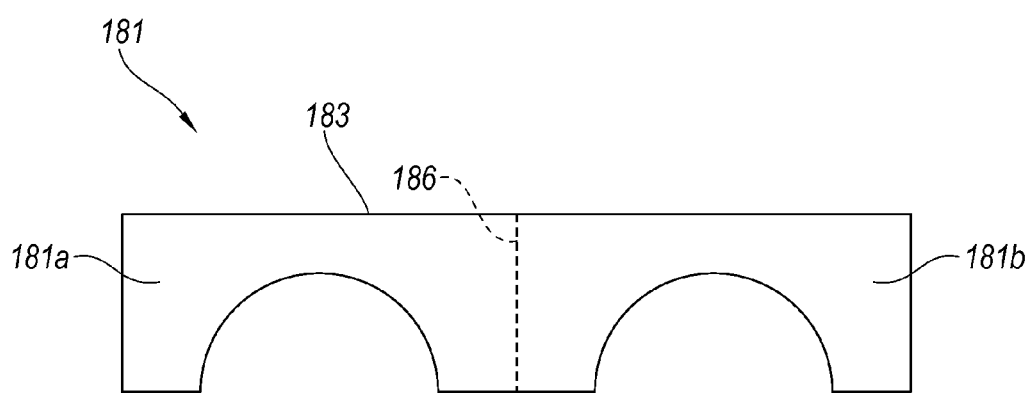
FIG. 1C is a front view of a monolith crown for use with the sole flue shown in FIG. 1B and configured in accordance with embodiments of the technology.

FIG. 1C is a front view of a monolith crown 181 for use with the sole flue 126 shown in FIG. 1B and configured in accordance with embodiments of the technology. In the illustrated embodiment, the crown 181 comprises a plurality of adjacent arched portions 181a, 181b having a flat top 183. Each portion 181a, 181b can be used as a crown for an individual run in the sole flue 126. Further, the flat top 183 can comprise a floor or subfloor for the oven chamber 185 described above with reference to FIG. 1A. In some embodiments, a layer of bricks can be placed on top of the flat top 183.

In various embodiments, the crown 181 can comprise a single monolith segment or a plurality of individual segments (e.g., the individual arched portions 181a, 181b) that are separated by an optional joint 186 shown in broken line. Accordingly, a single monolith crown 181 can cover one run or a plurality of adjacent runs in the sole flue 126. As mentioned above, in further embodiments the crown 181 can have shapes other than an arched underside with a flat top. For example, the crown 181 can be entirely flat, entirely arched or curved, or other combinations of these characteristics. While the crown 181 has been described for use with the sole flue 126 of FIG. 1B, it could similarly be used with the sole flue 116 or coking chamber 185 shown in FIG. 1A.

Figure 2A:
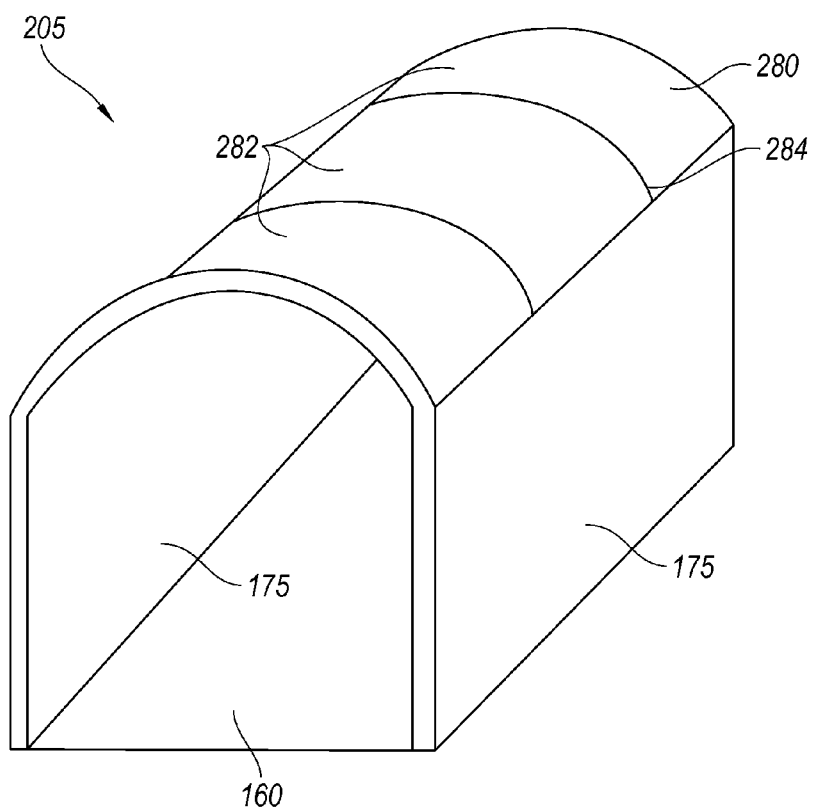
FIG. 2A is an isometric view of a coke oven having a monolith crown configured in accordance with embodiments of the technology.

FIG. 2A is an isometric view of a coke oven 205 having a monolith crown 280 configured in accordance with embodiments of the technology. The oven 205 is generally similar to the oven 105 described above with reference to FIG. 1. For example, the oven 205 includes the oven floor 160 and the opposing sidewalls 175. The crown 280 comprises a monolith structure, wherein the crown 280 extends between the sidewalls 175. In the illustrated embodiment, the crown 280 comprises a plurality of crown segments 282 generally adjacent to one another and aligned along the length of the oven 205 between the front and back of the oven 205. While three segments 282 are illustrated, in further embodiments there can be more or fewer segments 282. In still further embodiments, the crown 280 comprises a single monolith structure extending from the front of the oven 205 to the back. In some embodiments, multiple segments 282 are used to ease construction. The individual segments can meet joints 284. In some embodiments, the joints 284 are filled with refractory material, such as refractory blanket, mortar, or other suitable material, to prevent air in-leakage and unintentional exhaust. In still further embodiments, as will be discussed with reference to FIG. 4 below, the crown 280 can comprise multiple lateral segments between the sidewalls 175 that meet or join over the oven floor 160.

Figure 2B:
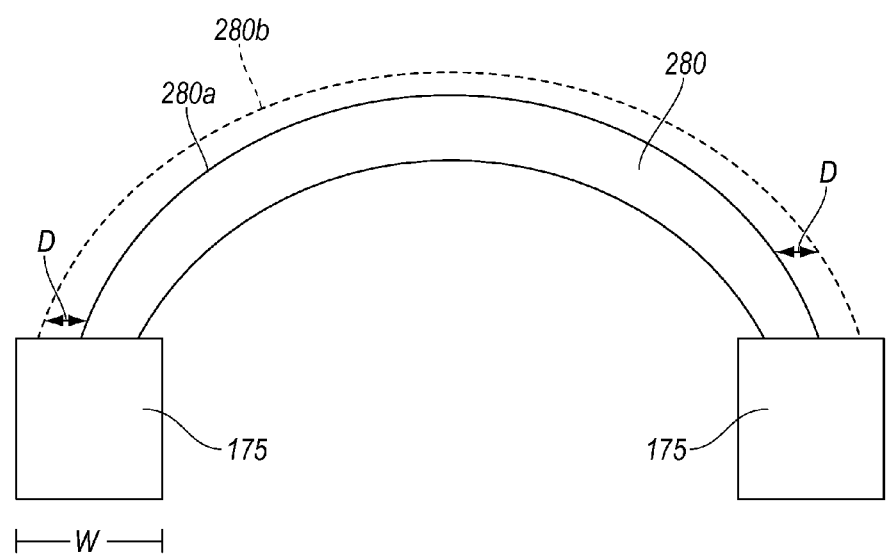
FIG. 2B is a front view of the monolith crown of FIG. 2A moving between a contracted configuration and an expanded configuration in accordance with embodiments of the technology.

FIG. 2B is a front view of the monolith crown 280 of FIG. 2A moving between a contracted configuration 280a and an expanded configuration 280b in accordance with embodiments of the technology. As discussed above, traditional crown materials expand upon oven heating and contract upon cooling. This retraction can create space between individual oven bricks and cause bricks in the crown to collapse into the oven chamber. Using a monolith, however, the crown 280 expands and contracts as a single structure.

The design of the oven 205 provides structural support for such expansion and contraction upon heating and cooling. More specifically, the sidewalls 175 that support the crown 280 can have a width W that is sufficiently greater than the width of the crown 280 to fully support the crown 280 as the crown 280 moves laterally between the contracted 280a and expanded 280b configurations. For example, the width W can be at least the width of the crown 280 plus the distance D of expansion. Therefore, when the crown 280 expands or is translated laterally outward upon heating, and contracts and translates laterally inward again upon cooling, the sidewalls 175 maintain support of the crown 280. The crown 280 can likewise expand or translate longitudinally outward upon heating, and contract and translate longitudinally inward upon cooling. The front and back walls (or door frames) of the oven 205 can accordingly be sized to accommodate this shifting.

In further embodiments, the crown 280 can rest on a crown footing other than directly on the sidewalls 175. Such a footing can be coupled to or an independent structure of the sidewalls 175. In still further embodiments, the entire oven may be made of expanding and contracting material and can expand and contract with the crown 280, and may not require sidewalls having a width as large as the width W shown in FIG. 2B because the crown 280 stays generally aligned with the expanding sidewalls 175 upon heating and cooling. Similarly, if both the crown 280 and sidewalls 175 are made of a thermally-volume-stable material, then the sidewalls 175 can stay generally aligned with the crown 280 upon heating and cooling, and the sidewalls 175 need not be substantially wider (or even as wide) as the crown 280. In some embodiments, the sidewalls 175, front or back door frames, and/or crown 280 can be retained in place via a compression or tension system, such as a spring-load system. In a particular embodiment, the compression system can include one or more buckstays on an exterior portion of the sidewalls 175 and configured to inhibit the sidewalls 175 from outward movement. In further embodiments, such a compression system is absent.

Figure 2C:
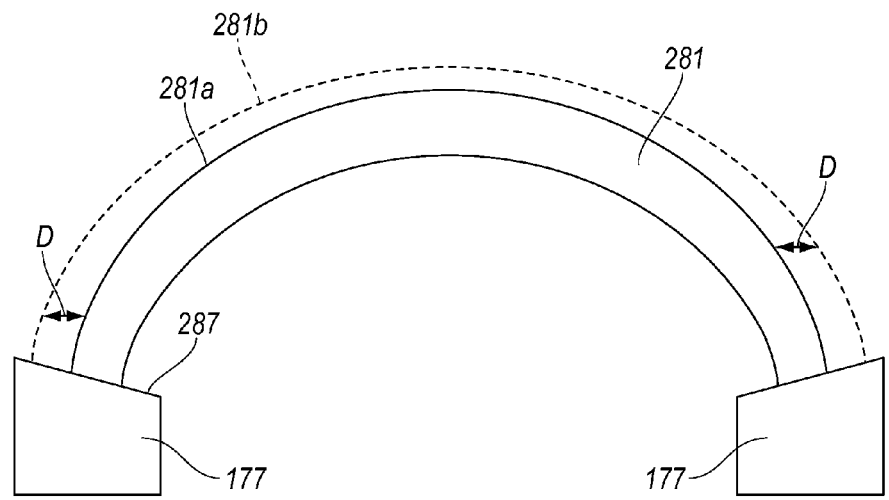
FIG. 2C is a front view of oven sidewalls for supporting a monolith crown configured in accordance with further embodiments of the technology.

FIG. 2C is a front view of oven sidewalls 177 for supporting a monolith crown 281 configured in accordance with further embodiments of the technology. The sidewalls 177 and crown 281 are generally similar to the sidewalls 175 and crown 280 shown in FIG. 2B. In the embodiment shown in FIG. 2C, however, the sidewalls 177 and crown 281 have an angled or slanted interface 287. Thus, when the crown 281 expands distance D upon heating (i.e., translates from position 281a to position 281b), the crown 281 translates along the slanted surface of the top of the sidewall 177 following the pattern of the interface 287.

Figure 2D:
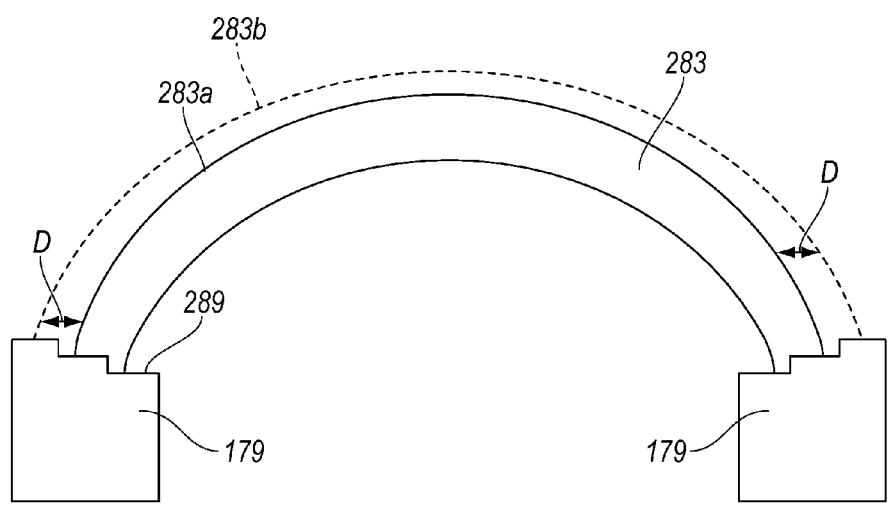
FIG. 2D is a front view of oven sidewalls for supporting a monolith crown configured in accordance with further embodiments of the technology.

In other embodiments, the crown 281 and sidewalls 177 can interface in other patterns, such as recesses, slots, overlapping portions, and/or interlocking features. For example, FIG. 2D is a front view of oven sidewalls 179 for supporting a monolith crown 283 configured in accordance with further embodiments of the technology. The sidewalls 179 and crown 283 are generally similar to the sidewalls 175 and crown 280 shown in FIG. 2B. In the embodiment shown in FIG. 2D, however, the sidewalls 179 and crown 283 have a stepped or zigzag interface 289. Thus, when the crown 283 expands distance D upon heating (i.e., translates from position 283a to position 283b), the crown 283 translates along the stepped surface of the top of the sidewall 179 following the pattern of the interface 289.

FIG. 3 is an isometric view of a coke oven 305 having a monolith crown 380 configured in accordance with further embodiments of the technology. Because the crown 380 is preformed, it can take on shapes other than the traditional arch. In the illustrated embodiment, for example, the crown 380 comprises a generally flat surface. This design can provide for minimal material costs. In other embodiments, other crown shapes can be employed to improve gas distribution in the oven 305, to minimize material costs, or for other efficiency factors.

FIG. 4A is an isometric view of a coke oven 405 having a monolith crown 480 configured in accordance with other embodiments of the technology. The crown 405 comprises a plurality (e.g., two) monolith portions 482 that meet at a joint 486 over the oven floor 160. The joint 486 can be sealed and/or insulated with any suitable refractory material if necessary. In various embodiments the joint(s) 486 can be centered on the crown 480 or can be off-center. The monolith portions 482 can be the same size or a variety of sizes. The monolith portions 482 can be generally horizontal or angled (as shown) relative to the oven floor 160. The angle can be selected to optimize air distribution in the oven chamber. There can be more or fewer monolith portions 482 in further embodiments.

Figure 4B:
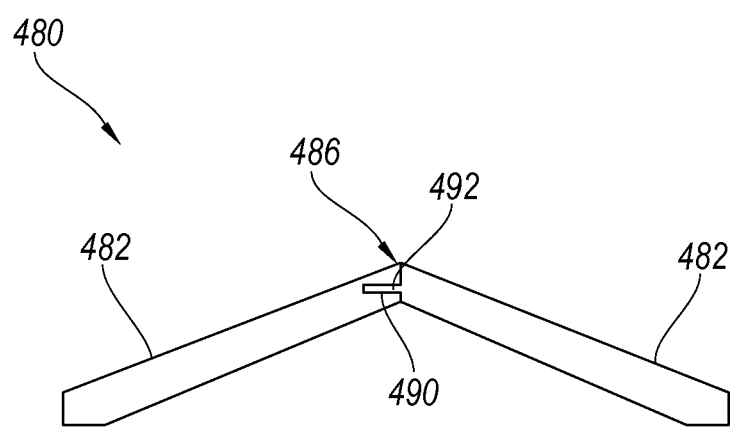
FIG. 4B is a front view of the monolith crown of FIG. 4A configured in accordance with further embodiments of the technology.

FIG. 4B is a front view of the monolith crown 480 of FIG. 4A configured in accordance with further embodiments of the technology. As shown in FIG. 4B, the monolith portions 482 can include an interfacing feature at the joint 486 to better secure the monolith portions 482 to one another. For example, in the illustrated embodiment, the joint 486 comprises a pin 492 on one monolith portion 482 configured to slide into and interface with a slot 490 on the adjacent monolith portion 482. In further embodiments, the joint 486 can comprise other recesses, slots, overlapping features, interlocking features, or other types of interfaces. In still further embodiments, mortar is used to seal or fill the joint 486.

While the illustrated interfacing feature is along a joint 486 that is generally parallel to the sidewalls 175, in further embodiments the interfacing feature can be used at a joint that is generally perpendicular to the sidewalls 175. For example, any of the interfacing features described above could be used at the joints 284 between the crown segments 282 of FIG. 2A. Thus, the interfacing features can be used at any joint in the crown 480, regardless of whether monolith portions are orientated side-to-side or front-to-back over the oven floor.

Figure 5:
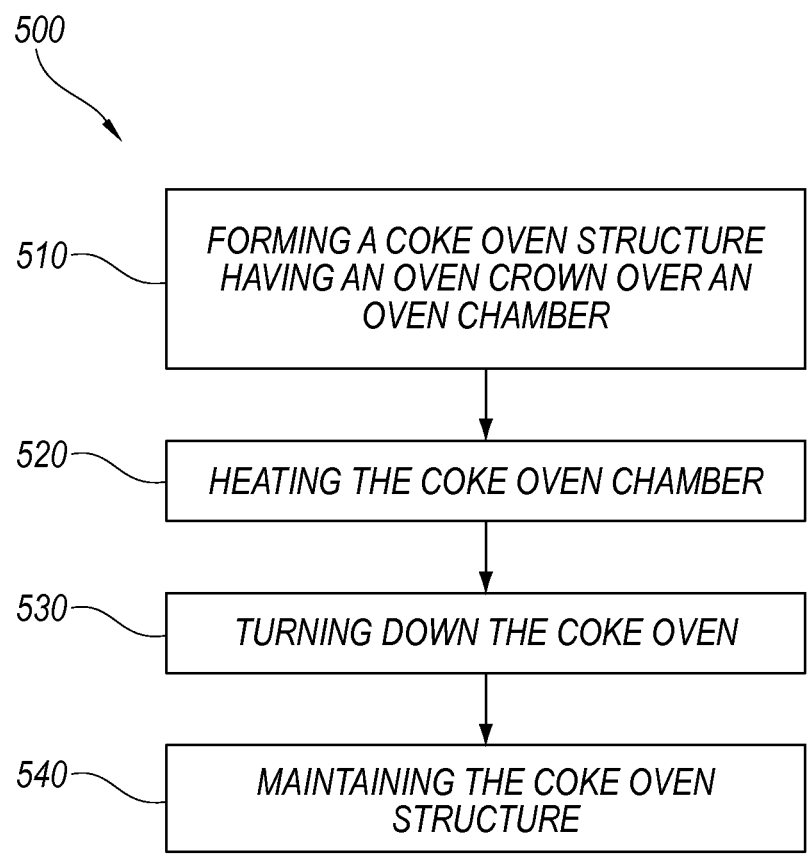
FIG. 5 is a block diagram illustrating a method of turning down a horizontal heat recovery coke oven.

FIG. 5 is a block diagram illustrating a method 500 of turning down a horizontal heat recovery coke oven. At block 510, the method 500 includes forming a coke oven structure having an oven crown over an oven chamber. In some embodiments, the crown is formed at least in part with a thermally-volume-stable material. In further embodiments, the crown is formed as a monolith (or several monolith segments) spanning between oven sidewalls.

At block 520 the method 500 includes heating the coke oven chamber. In some embodiments, the oven chamber is heated above the thermally-volume-stable temperature of a given material (e.g., above 1,200° F. in the case of a silica oven). The method 500 then includes turning down the coke oven below a thermally-volume-stable temperature at block 530. For materials having a thermally-volume-stable temperature, like silica, this comprises dropping the oven temperature below this temperature (e.g., below 1,200° F. in the case of a silica oven). For thermally-volume-stable materials, like fused silica, or materials not having a thermally-volume-stable temperature, like alumina, the step of turning down the coke oven below a thermally volume-stable temperature comprises turning down the oven temperature to any lesser temperature. In particular embodiments, turning down the coke oven comprises turning off the coke oven entirely. In further embodiments, turning down the coke oven comprises turning down the coke oven to a temperature of about 1,200° F. or less. In some embodiments, the coke oven is turned down to 50% or less of the maximum operating capacity. At block 540, the method 500 further includes maintaining the coke oven structure, including the integrity of the oven crown. The oven is thus turned down without crown collapse as experienced in traditional ovens. In some embodiments, the oven is turned down without causing significant crown contraction. The method described above can be applied to a coking chamber, sole flue, or other portion of the oven.

Examples

The following Examples are illustrative of several embodiments of the present technology.

1. A coke oven chamber, comprising:
   a floor;
   a front wall extending vertically upward from the floor and a back wall opposite the front wall;
   a first sidewall extending vertically upward from the floor between the front wall and the back wall and a second sidewall opposite the first sidewall; and
   a monolith crown positioned above the floor and spanning from the first sidewall to the second sidewall.

2. The coke oven chamber of example 1 wherein the monolith crown comprises a plurality of monolith portions spanning from the first sidewall to the second sidewall, wherein the plurality of monolith portions are positioned generally adjacent to one another between the front wall and the back wall.

3. The coke oven chamber of example 1 wherein:
   at least one of the monolith crown or sidewalls are configured to translate, contract, or expand by an adjustment amount upon heating or cooling the coke oven chamber;
   the monolith crown comprises a first end portion resting on the first sidewall and a second end portion opposite the first end portion and resting on the second sidewall; and
   the first sidewall and the second sidewall have an interface area greater than the adjustment amount.

4. The coke oven chamber of example 1 wherein the chamber comprises a coking chamber, a sole flue run, or a plurality of adjacent sole flue runs.

5. The coke oven chamber of example 4 wherein the chamber comprises a sole flue having a plurality of adjacent runs between the first sidewall and the second sidewall, and wherein the monolith crown extends over the plurality of the adjacent runs.

6. The coke oven chamber of example 5 wherein the monolith crown comprises a plurality of adjacent arches.

7. The coke oven chamber of example 1 wherein the monolith crown comprises a non-arch shape.

8. The coke oven chamber of example 1 wherein the monolith crown comprises a generally flat shape.

9. The coke oven chamber of example 1 wherein the monolith crown comprises a thermally-volume-stable material.

10. The coke oven chamber of example 1 wherein the monolith crown comprises at least one of a fused silica, zirconia, or refractory material.

11. The coke oven chamber of example 1 wherein the chamber comprises a horizontal heat recovery coke oven chamber.

12. The coke oven chamber of example 1 wherein the monolith crown has a crown width, and wherein the crown width is at least three feet.

13. The coke oven chamber of example 1 wherein the monolith crown meets at least one of the first sidewall or the second sidewall with an overlapping or interlocking joint.

14. A coke oven chamber, comprising:
   a chamber floor;
   a plurality of sidewalls generally orthogonal to the chamber floor; and
   a crown positioned above the chamber floor and at least partially spanning an area between at least two sidewalls, wherein the crown comprises a thermally volume-stable material.

15. The coke oven chamber of example 14 wherein the crown comprises at least one of bricks or a monolith.

16. The coke oven chamber of example 14 wherein the thermally-volume-stable material comprises fused silica or zirconia.

17. The coke oven chamber of example 14 wherein the crown comprises a surface parallel, arched, or angled relative to the floor.

18. The coke oven chamber of example 14 wherein the chamber comprises a coking chamber or a sole flue.

19. The coke oven chamber of example 14 wherein the crown comprises a first crown portion and a second crown portion, and wherein the first crown portion and second crown portion meet over the area between the plurality of sidewalls.

20. The coke oven chamber of example 14 wherein the crown comprises a monolith arch or a plurality of adjacent arches.

21. A method of turning down a horizontal heat recovery coke oven, the method comprising:
    forming a coke oven structure having a floor, a first sidewall and a second sidewall opposite the first sidewall, and an oven crown over the floor in a space at least partially between the first sidewall and the second sidewall;
    heating the coke oven;
    turning down the coke oven below a thermally-volume-stable temperature; and
    maintaining the coke oven structure.

22. The method of example 21 wherein forming the coke oven structure comprises forming an oven at least partially of thermally volume-stable material.

23. The method of example 21 wherein forming the coke oven structure comprises forming a monolith spanning at least a portion of a distance between the first sidewall and the second sidewall.

24. The method of example 21 wherein forming the coke oven structure comprises forming a coke oven structure at least partially of silica brick, and wherein turning down the coke oven below a thermally-volume-stable temperature comprises turning down the coke oven below a temperature of 1,200° F.

25. The method of example 21 wherein turning down the coke oven comprises turning down oven operation to 50% of operational capacity or less.

26. The method of example 21 wherein turning down the coke oven comprises turning off the oven.

27. The method of example 21 wherein turning down the coke oven comprises cooling the crown without causing crown contraction.

From the foregoing it will be appreciated that, although specific embodiments of the technology have been described herein for purposes of illustration, various modifications may be made without deviating from the spirit and scope of the technology. For example, while several embodiments have been described in the context of HHR ovens, in further embodiments the monolith or thermally-volume-stable designs can be used in non-HHR ovens, such as byproduct ovens. Further, certain aspects of the new technology described in the context of particular embodiments may be combined or eliminated in other embodiments. For example, while certain embodiments have been discussed in the context of a crown for a coking chamber, the flat crown, monolith crown, thermally-volume-stable materials, and other features discussed above can be used in other portions of a coke oven system, such as a crown for a sole flue. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A horizontal heat recovery coke oven chamber, comprising:
    a floor;
    a front wall extending vertically upward from the floor and a back wall opposite the front wall;
    a first sidewall extending vertically upward from the floor between the front wall and the back wall and a second sidewall opposite the first sidewall; and
    a monolith crown positioned above the floor and spanning from the first sidewall to the second sidewall.

2. The horizontal heat recovery coke oven chamber of claim 1 wherein the monolith crown comprises a plurality of monolith portions spanning from the first sidewall to the second sidewall, wherein the plurality of monolith portions are positioned generally adjacent to one another between the front wall and the back wall.

3. The horizontal heat recovery coke oven chamber of claim 1 wherein:
    at least one of the monolith crown or sidewalls are configured to translate, contract, or expand by an adjustment amount upon heating or cooling the horizontal heat recovery coke oven chamber;
    the monolith crown comprises a first end portion resting on the first sidewall and a second end portion opposite the first end portion and resting on the second sidewall; and
    the first sidewall and the second sidewall have an interface area greater than the adjustment amount.

4. The horizontal heat recovery coke oven chamber of claim 1 wherein the chamber comprises a coking chamber, a sole flue run, or a plurality of adjacent sole flue runs.

5. The horizontal heat recovery coke oven chamber of claim 4 wherein the chamber comprises a sole flue having a plurality of adjacent runs between the first sidewall and the second sidewall, and wherein the monolith crown extends over the plurality of the adjacent runs.

6. The horizontal heat recovery coke oven chamber of claim 5 wherein the monolith crown comprises a plurality of adjacent arches.

7. The horizontal heat recovery coke oven chamber of claim 1 wherein the monolith crown comprises a thermally-volume-stable material.

8. The horizontal heat recovery coke oven chamber of claim 1 wherein the monolith crown comprises at least one of a fused silica, zirconia, or refractory material.

9. The horizontal heat recovery coke oven chamber of claim 1 wherein the monolith crown has a crown width, and wherein the crown width is at least three feet.

10. The horizontal heat recovery coke oven chamber of claim 1 wherein the monolith crown meets at least one of the first sidewall or the second sidewall with an overlapping or interlocking joint.

11. A method of turning down a horizontal heat recovery coke oven, the method comprising:
    forming a horizontal heat recovery coke oven structure having a floor, a first sidewall and a second sidewall opposite the first sidewall, and an oven crown over the floor in a space at least partially between the first sidewall and the second sidewall; the oven crown comprising a material characterized by a known thermally-volume-stable temperature;
    heating the horizontal heat recovery coke oven above the known thermally-volume-stable temperature;
    turning down the horizontal heat recovery coke oven below the thermally-volume-stable temperature; and
    maintaining the horizontal heat recovery coke oven structure.

12. The method of claim 11 wherein forming the horizontal heat recovery coke oven structure comprises forming an oven at least partially of thermally volume-stable material.

13. The method of claim 11 wherein forming the horizontal heat recovery coke oven structure comprises forming a monolith spanning at least a portion of a distance between the first sidewall and the second sidewall.

14. The method of claim 11 wherein forming the horizontal heat recovery coke oven structure comprises forming a horizontal heat recovery coke oven structure at least partially of silica brick, and wherein turning down the horizontal heat recovery coke oven below a thermally-volume-stable temperature comprises turning down the horizontal heat recovery coke oven below a temperature of 1,200° F.

15. The method of claim 11 wherein turning down the horizontal heat recovery coke oven comprises turning down oven operation to 50% of operational capacity or less.

16. The method of claim 11 wherein turning down the horizontal heat recovery coke oven comprises turning off the horizontal heat recovery coke oven.

17. The method of claim 11 wherein turning down the horizontal heat recovery coke oven comprises cooling the crown without causing crown contraction.

* * * * *